Patented Apr. 15, 1930                                                                      1,755,135

UNITED STATES PATENT OFFICE

JOHN R. SHIPNER, OF OMAHA, NEBRASKA, ASSIGNOR TO THE CUDAHY PACKING COMPANY, OF OMAHA, NEBRASKA, A CORPORATION OF MAINE

LARD PRODUCT AND METHOD OF MAKING THE SAME

No Drawing.    Application filed June 1, 1929. Serial No. 367,837.

This invention relates to an improved lard product and to an improved method of making the same, and includes improvements in both process and product.

More particularly, the present invention relates to a refined and hydrogenated lard product of greatly improved stability and keeping qualities, which is odorless and neutral in flavor, which has a high smoke point, which has improved creaming qualities and which is suitable for use for such purposes as cake baking and icing preparation.

The invention includes an improved process of producing such a product in which the lard is refined to remove more or less completely the free fatty acids which it contains, together with other impurities, in which the refined lard is subjected to hydrogenation to a regulated and limited extent, and in which the hydrogenated lard is deodorized to give an improved product of the character referred to.

The lard of commerce is of poor keeping quality, frequently becoming rancid before it reaches the consumer, particularly in warm weather or in warm climates. Ordinary lard also varies in color, flavor and consistency. It has a low smoke point and usually a substantially free fatty acid content. It is lacking or deficient in creaming property and this, together with its flavor, makes it unsuitable for use in making cakes and frosting, for which purposes other fats are employed.

The present invention provides an improved refined and hydrogenated lard product in which the objections to ordinary lard, above mentioned, are overcome or minimized, and which has properties adapting it for use for purposes, such as cake baking and frosting, for which lard has not heretofore been used.

According to the present invention the lard is first subjected to a refining treatment to free it more or less completely from free fatty acids and to remove other impurities such as proteins. Lard, even in a freshly rendered condition, usually has an appreciable content of free fatty acids amounting, for example, to around ½% or more. By refining the lard the free fatty acid content is reduced to as low an extent as is practicable and ordinarily to below 0.10% and down to, in some cases, as low as 0.01%. This refining treatment for removing free fatty acids and other impurities can be carried out, for example, with the use of a regulated amount of dilute caustic soda solution with thorough agitation to insure intimacy of contact of the solution with all parts of the lard while in a warm, liquid condition. This treatment results in removing the free fatty acids more or less completely and also removing impurities such as proteins which are present in the untreated lard. After removing the resulting soap solution, for example, by settling, the refined lard is obtained free or nearly so from free fatty acids and freed more or less completely from other impurities.

The refined lard is next subjected to hydrogenation using, for example, a small amount of an active reduced nickel catalyst amounting to from 0.10 to 0.30% of the lard, and introducing hydrogen gradually and progressively into a body of the hot lard maintained at a suitable hydrogenation temperature, e. g., around 300 to 350° F., and with suitable agitation during the addition of hydrogen. The hydrogenation should be regulated and limited to prevent the lard from being hydrogenated to too great an extent, and the hydrogenation should be stopped while the hydrogenated lard is still of such consistency that upon chilling it will still be of lard-like consistency. The hydrogenation is accompanied with a reduction of the iodine value and an increase in the melting point and titre. In general, the iodine values of the hydrogenated lard will be around 55 to 60, the melting points around 48 to 51° C. and the titres around 40 to 41° C.

The hydrogenated lard is freed from the catalyst by filtration and is then subjected to a deodorizing treatment by blowing with steam at a suitable temperature, around 280 to 350° F. and for a suitable period of time, e. g., one to two hours. The deodorized product is again filtered and is then chilled to convert it from its hot liquid condition to a semi-solid consistency when cool. The chilling can be carried out in various ways, such as by the use of a chilling roll onto which the hot lard is continually flowed and from which the chilled lard is scraped, or by other intermittent or continuously operating cooling or chilling devices, preferably such as will rapidly cool and chill the lard with agitation or beating to incorporate more or less gas into the chilled product. The gas is advantageously an inert gas such as nitrogen or hydrogen, and the lard is advantageously packed in sealed packages in an atmosphere of such inert gas, thus protecting it from contact with the atmosphere. Even when the lard is not so protected by an inert gas it will have materially improved keeping qualities as compared with ordinary lard kept under corresponding conditions.

The improved lard product produced as above described is snow-white when solidified and water-white when melted. It is odorless and neutral in flavor and is suitable for the finest baking, such as the baking of cake. It has a high smoke point and is eminently suitable for deep frying. In particular the new product has creaming qualities such that it will cream over a considerable range in temperature and is comparable with or superior to other products now on the market in such creaming qualities. This and the other properties possessed by the improved lard product make it suitable for use in cake baking and in icing preparation. The new lard product can therefore be used for purposes for which ordinary lard is objectionable or unavailable. It is comparable with or superior to other shortening compositions such as hydrogenated vegetable oils of lard-like consistency which command higher price than ordinary lard, both to the large consumer and to the household trade.

It will thus be seen that the present invention provides an improved process of treating lard by refining, hydrogenating and deodorizing which results in producing a new and improved lard product of greatly improved keeping qualities and resistance to rancidity, and with other desirable properties which make it superior to ordinary lard and comparable with or superior to hydrogenated vegetable oils in keeping and other properties.

I claim:

1. The method of treating lard to improve its keeping and other properties which comprises subjecting the lard to a refining treatment to remove free fatty acids more or less completely therefrom and give a substantially neutral product, hydrogenating the refined lard to a regulated and limited extent to give a hydrogenated product of improved stability but still of lard-like consistency when cooled, deodorizing the hydrogenated lard, and cooling the deodorized product to impart to it a lard-like consistency.

2. The method of treating lard to improve its keeping and other properties which comprises subjecting the lard to refining with a dilute caustic soda solution to remove free fatty acids more or less completely therefrom together with other impurities and give a substantially neutral product, removing the resulting soap solution from the treated lard, subjecting the treated lard to regulated and limited hydrogenation to give a hydrogenated lard product of improved stability but still of lard-like consistency when cooled, deodorizing the hydrogenated product and cooling the deodorized product.

3. An improved lard product comprising refined hydrogenated deodorized and substantially neutral lard which is odorless and neutral in flavor, of high smoke point, said product being superior to ordinary lard in stability and keeping properties and having creaming properties which make it suitable for use for such purposes as cake baking and frosting.

4. A new lard product such as defined in claim 3 having an iodine number of around 55 to 60, a melting point of around 48 to 51 and titre around 40 to 41.

In testimony whereof I affix my signature.

JOHN R. SHIPNER.